United States Patent [19]

Miles

[11] Patent Number: 6,125,340
[45] Date of Patent: Sep. 26, 2000

[54] SYSTEM FOR DETERMINING THE PROBABILITY THAT ITEMS OF EVIDENCE PROVE A CONCLUSION

[75] Inventor: Martin John Miles, Boulder, Colo.

[73] Assignee: Convex Systems, Inc., Boulder, Colo.

[21] Appl. No.: 09/038,085

[22] Filed: Mar. 11, 1998

[51] Int. Cl.[7] .................................................. G06F 101/14

[52] U.S. Cl. ............................. 702/181; 702/179; 705/12

[58] Field of Search .................................. 702/179, 180, 702/181; 705/10, 27, 12

[56] References Cited

U.S. PATENT DOCUMENTS

| | | | |
|---|---|---|---|
| 4,996,642 | 2/1991 | Hey | 705/27 |
| 5,317,730 | 5/1994 | Moore et al. | 707/100 |
| 5,530,853 | 6/1996 | Schell et al. | 707/1 |
| 5,684,951 | 11/1997 | Goldman et al. | 707/9 |
| 5,689,696 | 11/1997 | Gibbons et al. | 702/181 |
| 5,790,426 | 8/1998 | Robinson | 702/179 |

OTHER PUBLICATIONS

Martin J. Miles, "Math Sense for Jurors: .8+.7−.8x.7=.94", *The National Law Journal*, Mar. 31, 1997, p. A23.

*Primary Examiner*—Marc S. Hoff
*Assistant Examiner*—Bryan Bui
*Attorney, Agent, or Firm*—Duft, Graziano & Forest, P.C.

[57] ABSTRACT

A system for determining whether items of evidence prove a conclusion based upon user input data. The software of the present invention interrogates a user to receive characteristic information about the user and for information about the items of evidence in a trial. In accordance with the present invention, a user inputs a probability for each item of evidence that the item of evidence is true and a probability that the item of evidence proves a conclusion. The software of the present invention then calculates the probability that each item of evidence individually proves the conclusion and the probability that all of the items of evidence combined prove the conclusion. The software of the present invention than performs statistical analysis of the data receive from several users to determine trends about the evidence and to model a jury or to select a jury from a pool of potential jurors.

67 Claims, 17 Drawing Sheets

SYSTEM FOR DETERMINING THE PROBABILITY THAT ITEMS OF EVIDENCE PROVE A CONCLUSION

FIELD OF THE INVENTION

The present invention relates to the provision of a computer-based system for determining whether certain items of evidence prove a conclusion. More particularly, the present invention relates to using probability theory upon subjective probabilities for items of evidence input by a user to determine the probability of an event based upon the items of evidence. The present invention also relates to using probability theory and statistical analysis upon subjective probabilities given by a plurality of users to determine a statistical conclusion and a probability that acceptance or rejection of the conclusion is in error.

PROBLEM

In the last several years, several notable trials have taken place in the courtrooms of the United States of America. Some of the more notable trials are the O. J. Simpson murder trial, and the Oklahoma City Bombing trials of Timothy McVeigh and Terry Nichols. With the proliferation of media in this country, people have followed these trials closely and have formed opinions about the items and statements of evidence in these trials. A good example is the O. J. Simpson murder trial.

All of the court proceedings in the O. J. Simpson murder trial were televised on a cable television channel for the general public to watch. Many televisions stations also devoted entire news television shows to the proceedings in the O. J. trial. People watching the proceedings and shows formed opinions about each item and statement of evidence. Some of these people felt a need to express these opinions in public and to compare their opinions with the opinions of others. As a result, many television and radio call-in talk shows devoted air time to discussing peoples' opinions about the statements and items in evidence.

Unlike the O. J. Simpson case, most publicized cases do not generate the interest that warrants the use of special forums, such as talk radio shows, to allow people to voice their opinions about the items or statements of evidence in the trial. However, people still feel the desire to publicly express their opinions about the evidence in the trial and to compare their opinions with other people or to see what conclusions can be reached from their opinions about the case.

Furthermore, trial attorneys and jury consultants desire to use the opinions of people viewing the proceedings of a publicized trial to form strategies for the case that is presented to a jury in the trial. The opinions of the public watching the trial could be used to generate a model jury and to determine the strengths and weaknesses of a case presented at trial. There is a need by jury consultants and trial attorneys for a system that could gather the opinions of the general public about statements or items of evidence and generate a model of a chosen or a potential jury from these opinions.

SOLUTION

The above and other problems are solved and an advance in the art is made by the provision of a system for determining the probability that a specified agent is responsible for an outcome. The present invention relates to software executed by a personal computer or by a server computer accessed via an Internet or Intranet link from a personal computer. In accordance with the present invention, the software polls a user asking the user to input a probability that an item of evidence is true and the probability that the item, if true, establishes a premise. After the user has been polled, the software does a statistical analysis of the user's answers to determine if the premise is proven based upon the user's opinions. The result can then be displayed to the user, so that the user can see if a premise can be reached based upon the user's opinions. Some uses for the present invention includes games and jury modeling in trials.

In accordance with the present invention, the software polls a user in the following manner. First, the software requests the user input characteristic data including demographic information, opinions, and beliefs of the user. The user characteristic data is stored in a user database for future use. For each item of evidence, the software polls the user as to whether the item tends to prove or disprove the premise, the probability the item is true, and the probability that the item proves or disproves the premise if the item is true. The software also asks the user to quantify the burden of persuasion needed to establish the premise in terms of probability. The software stores all of the answers from a user in a database.

After the software has polled the user, probability theory is used to calculate the probability that each item of evidence individually could prove the premise based upon the user's input. Probability theory is also used to calculate the probability that the items of evidence as a whole prove the premise. The probability that the items of evidence prove the premise is compared to a burden of persuasion to determine whether the premise is proven. The result is then displayed to the user.

In accordance with the present invention, statistical analysis is performed on the calculated probabilities and the input probabilities of several users to study patterns in users' opinions about the evidence. One process for studying opinions of one user is to list the items of evidence in order from the item least likely to individually prove the premise to the item most likely to individually prove the premise. The process can also determine a subset containing the fewest number of items of evidence that collectively prove the premise beyond a burden of proof and a subset containing the largest number of items of evidence that do not collectively prove the premise beyond a burden of persuasion. The list and subsets are displayed to the user to show the user the items of evidence in the order of importance to the user.

A second process generates histograms to compare one user's input and results with the input and results from other users. For each item of evidence, a histogram is generated for the calculated probability that the item of evidence, if true, proves the premise and the probabilities input by the users. Histograms are also generated for the probability that the premise is proven by all the items of evidence, for the probability that the premise is disproved by the items of evidence and for the input probabilities of the burden of persuasion. These histograms are then displayed to the user or an administrator to compare user data.

A third process shows results of accumulated user data to show public opinion. The means, standard deviations, and limits of confidence intervals are determined for all of the probabilities input for each item of evidence, for the calculated probabilities that the premise is proved for the calculated probability that the premise is disproved, and the probability for the burden of persuasion. These results are then displayed to show public opinion.

A fourth and a fifth process determine whether a premise is satisfactorily disproved or proved based upon the calculated probabilities that the premise is proved and disproved. A sixth process determines the number of additional users needed to assure that a premise is satisfactorily proved or disproved according to the users. These results are then displayed to the user or an administrator to show the reliability of the received data.

One preferred exemplary embodiment of the present invention determines the outcome of a trial based upon user input. The preferred embodiment begins by interrogating the user for characteristic data which includes demographic information. For each item of evidence, the preferred embodiment interrogates the user for an answer as to whether the user believes the item of evidence trends to prove or disprove a fundamental issue or premise of the trial, a probability the item of evidence is true, and a probability that the item of evidence proves or disproves the fundamental issue of the trial given the item of evidence is true. An example of a fundamental issue in a trial is the guilt or innocence of a defendant. The user is also interrogated for a burden of persuasion in terms of probability and a maximum or minimum amount of damages.

After the user has been interrogated, a process calculates a probability that each item, if true, individually proves the fundamental issue and a probability that each item individually disproves the fundamental issue of the trial. A probability that items of evidence combine to prove the fundamental issue and a probability that the items of evidence combine to disprove the fundamental issue are also calculated. After the calculations are complete, the probability that the items of evidence combine to prove the fundamental issue is compared to the burden of persuasion input by the user by a subsequent process determining a vote. If the burden of persuasion is greater than the probability, the fundamental issue is not proven and the user would vote for the defendant. If the probability is greater than the burden of persuasion, the fundamental issue is proven and the user would vote for the plaintiff.

A subsequent process determines the amount of damages or penalty the user would award based upon the probability that the fundamental issue is proved. The items of evidence are displayed in lists of importance to proving the fundamental issue of the trial and the above described statistical analysis is performed. Another subsequent process analyzes a correlation between the characteristics of users and the probabilities input by users for each item of evidence.

In addition to the above processes, the preferred exemplary embodiment of the present invention provides processes for using the compiled information to determine how a jury composed of jurors with characteristics similar to users stored in the database would vote. The characteristic data received during the polling of the users can also be used to determine the characteristics of an ideal juror for one side, such as the plaintiff or defendant, in a trial or to predict how a pool of current jurors in a trial is going to vote if presented with certain statements or items of evidence. Attorneys or jury consultants could then use this information to modify their strategies for the current trial or other future trials.

DETAILED DESCRIPTION

Figure 1:
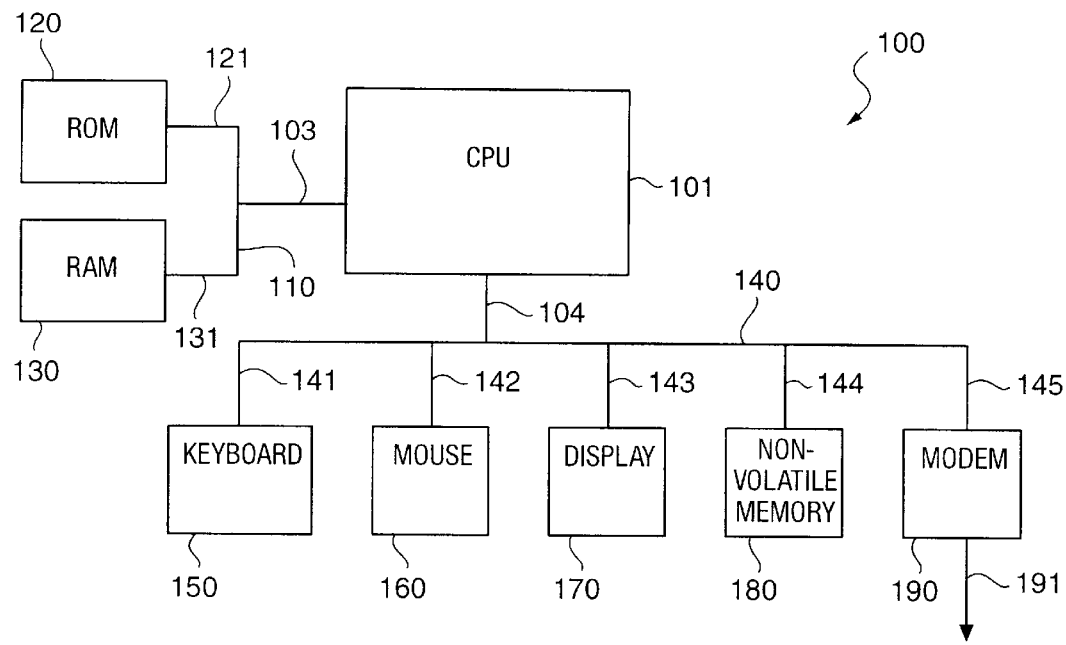
FIG. 1 illustrates a block diagram of a personal computer.
Figure 2:
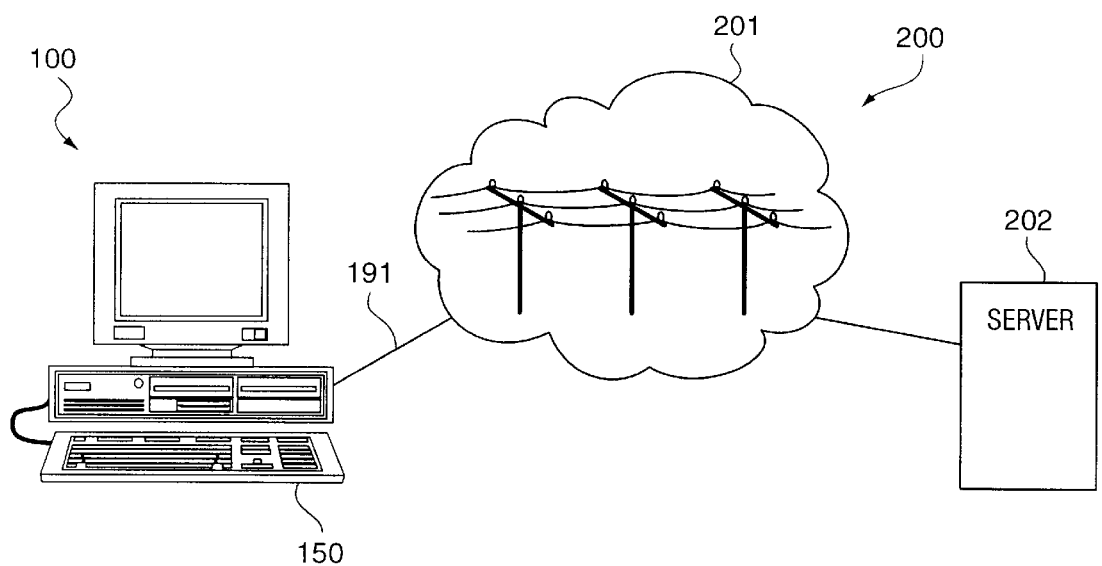
FIG. 2 illustrates a personal computer connected to a server computer via an Internet connection.

Systems Capable of Executing the Processes of the Present Invention FIGS. 1 and 2

The present invention is a process for determining the probability that items of evidence prove a conclusion that is executed by a processing system. FIG. 1 illustrates a block diagram of a personal computer 100 capable of executing the system of the present invention. Personal computer 100 has a central processing unit (CPU) 101 capable of executing instructions stored in a memory attached to CPU 101. CPU 101 is attached to a memory bus 110 via path 103. Memory bus 110 is connected to Read Only Memory (ROM) 120 via path 121 and to Random Access Memory (RAM) 130 via path 131. ROM 120 stores instructions used by CPU 101 to control the functions of personal computer 100. RAM 130 stores instructions such as the operating system and currently running applications, to be executed by CPU 101 as well as the data needed to perform the instructions. CPU 101 reads and writes data to RAM 103 via path 103 and bus 110.

CPU 101 is connected to I/O bus 140 via path 104. I/O bus 140 connects CPU 101 to peripheral devices to transmit data between CPU 101 and the peripheral devices. In the preferred exemplary embodiment, the peripheral devices connected to I/O bus 140 include keyboard 150, mouse 160, display 170, nonvolatile memory (disk drive) 180, and modem 190. Keyboard 150 is connected to I/O bus 140 via path 141 and allows a user to input data. Mouse 160 is connected to I/O bus 140 via path 142 and allows a user to input data by moving mouse 160 to move an icon across display 170. Display 170 is a video monitor and associated drivers connected to I/O bus 140 via path 143 to display images to a user. Nonvolatile memory 180 is a disk drive which can read and write data to a disk or other type of media to store the data for future use and is connected to I/O bus 140 via path 144. Modem 190 is a device which facilitates a connection of personal computer 100 to telephone line 191 for communication with other computers such as a server for an Internet connection. Modem 190 is connected to I/O bus 140 via path 145.

Alternatively, the present invention can be executed by a server computer that a user has accessed via a telephonic connection. FIG. 2 illustrates a connection between personal computer 100 and server computer 201 in system 200. Personal computer 100 has a modem 190 (Depicted in FIG. 1) which connects personal computer 100 to telephone line 191. Personal computer 100 is then communicatively connected to server computer 201 via telephone network 201. Server computer 201 can execute the processes of the present invention or alternatively connect personal computer 100 to a subsequent server (Not shown) that executes the processes of the present invention. A second alternative (not shown) is an Intranet connection between personal computer 100 and server computer 201.

Figure 3:
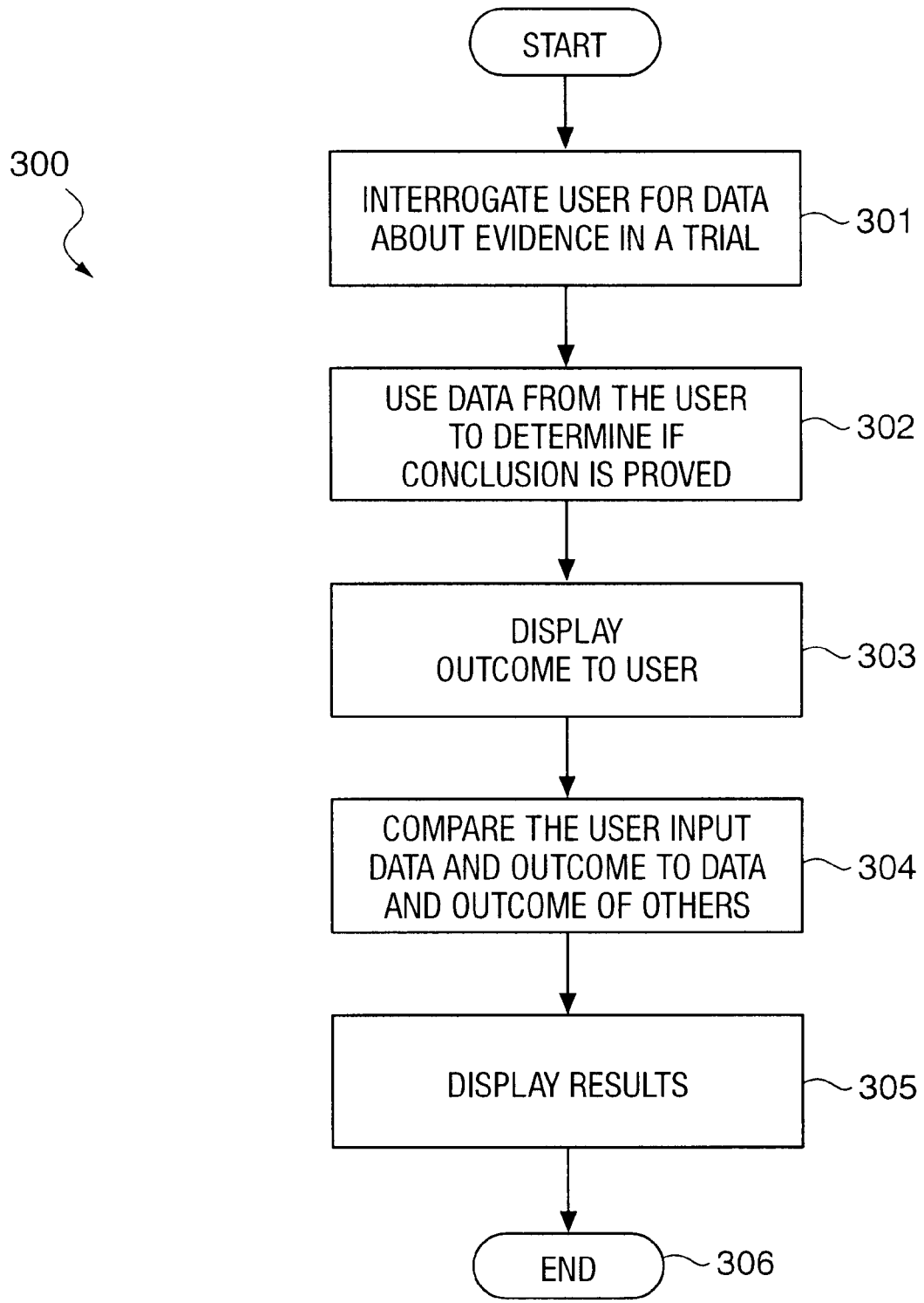
FIG. 3 illustrates an operational overview of the system of the present invention.

An Operational Overview of the Process of Determining a Probability That Items of Evidence Prove a Conclusion as Provided by the Present Invention FIG. 3

The present invention is a process 300 that provides a system for determining the probability that items of evidence prove a conclusion based on data input by a user as illustrated in FIG. 3. Process 300 begins in step 301 with an interrogation of the user to get the data needed to determine if the conclusion has been proved or disproved. In step 302, the data that the user has input is used to determine whether the items of evidence prove the conclusion. The results of step 302 are displayed to the user in step 303. In step 304, the data input by the user and the result of step 302 are compared to data and results of previous users of process 300 to allow the user or a subsequent user, such as an administrator of the system, to compare the user's results to the results of other users. In step 305, the results of step 304 are displayed to allow the user or the administrator to view the user results as compared to other users. The process ends in step 306.

Preferred Exemplary Embodiment for Determining the Probable Outcome of a Trial

The following discussion and subsequent drawings describe one possible preferred exemplary embodiment of the present invention used to determine a verdict in a judicial trial based upon user input data. It is understood that any of the processes described below can be designed with minimal effort to conform to any type of situation wherein several items of evidence are used to prove a conclusion. Other examples include, but are not limited to, determining a probable disease based upon a number of symptoms, and determining a cause of an accident in an investigation.

Figure 17:
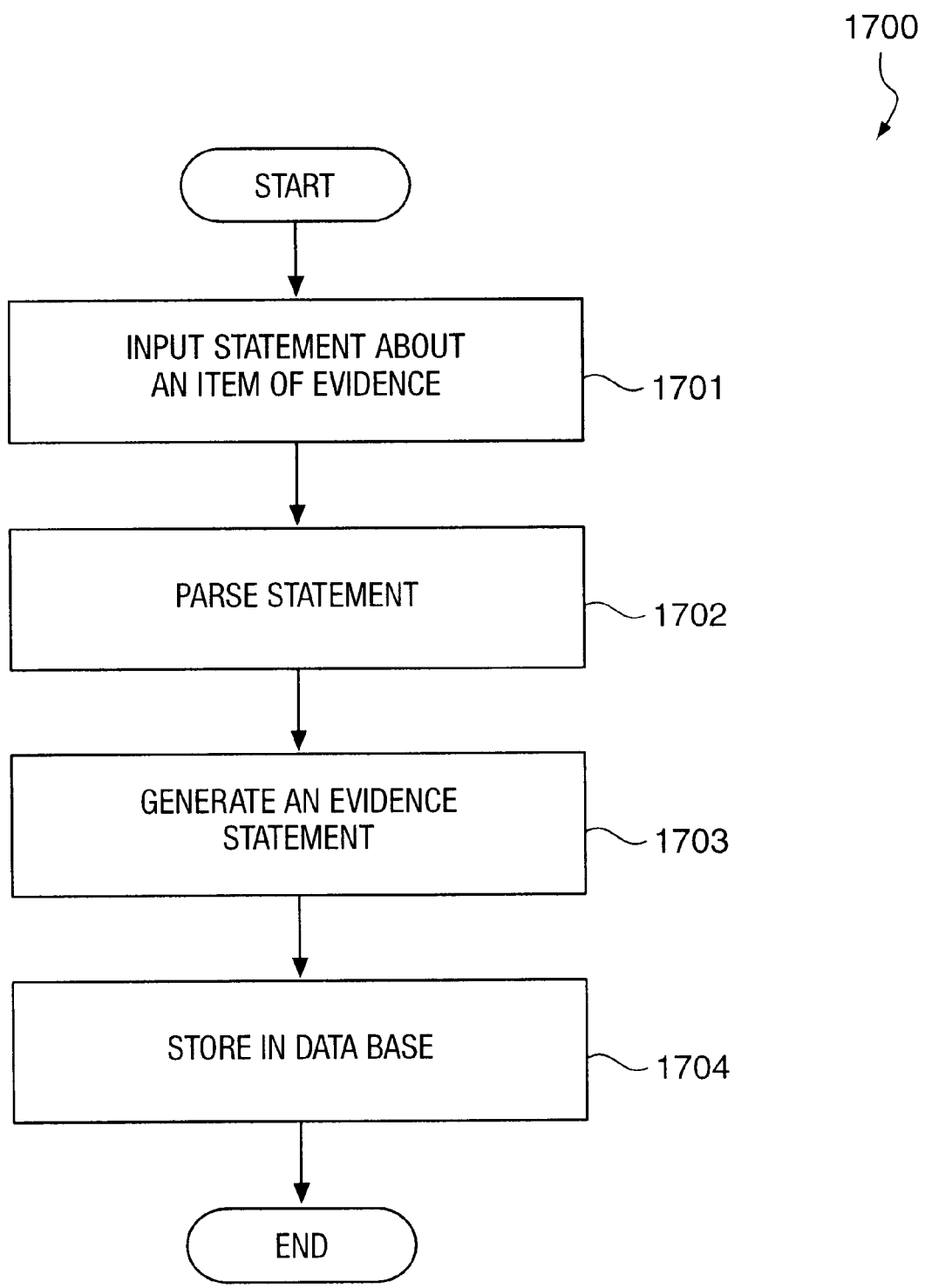
FIG. 17 illustrates a process for parsing an input of an item of evidence.

A Process for Entering Items of Evidence Into a Database—FIG. 17

In the preferred exemplary embodiment of the present invention an administrator, such as a user or a knowledge based system, input items of evidence that can prove or disprove a conclusion. In a trial, the conclusion is a fundamental issue of a trial. The fundamental issue of a trial is the single question that is being resolved by a trial such as the guilt or innocence of a defendant or the liability of a defendant for a plaintiff's damages. The process for inputting items of evidence is illustrated in FIG. 17.

Input process 1700 begins in step 1701 in which the administrator inputs an a statement about an item of evidence. In step 1702, the input statement is parsed. During the parsing process of step 1702, a parsing routine looks for indicators in the grammar structure of the statement to reduce the statement to simple facts about the item of evidence. The parsing also identifies and separates items of evidence in a statement that are independent from one another. For example, the parsing routine can determine who found the evidence, what the item of evidence is, when the item was found, and how the item of evidence is related to the fundamental question. In step 1703, the parsed statement is used to generate a statement about the item of evidence that will be presented to a user. The generated statement concisely states all of the information in format easily understandable to a user reading the statement. The statement is then stored in the evidence database in step 1704.

Figure 4A:
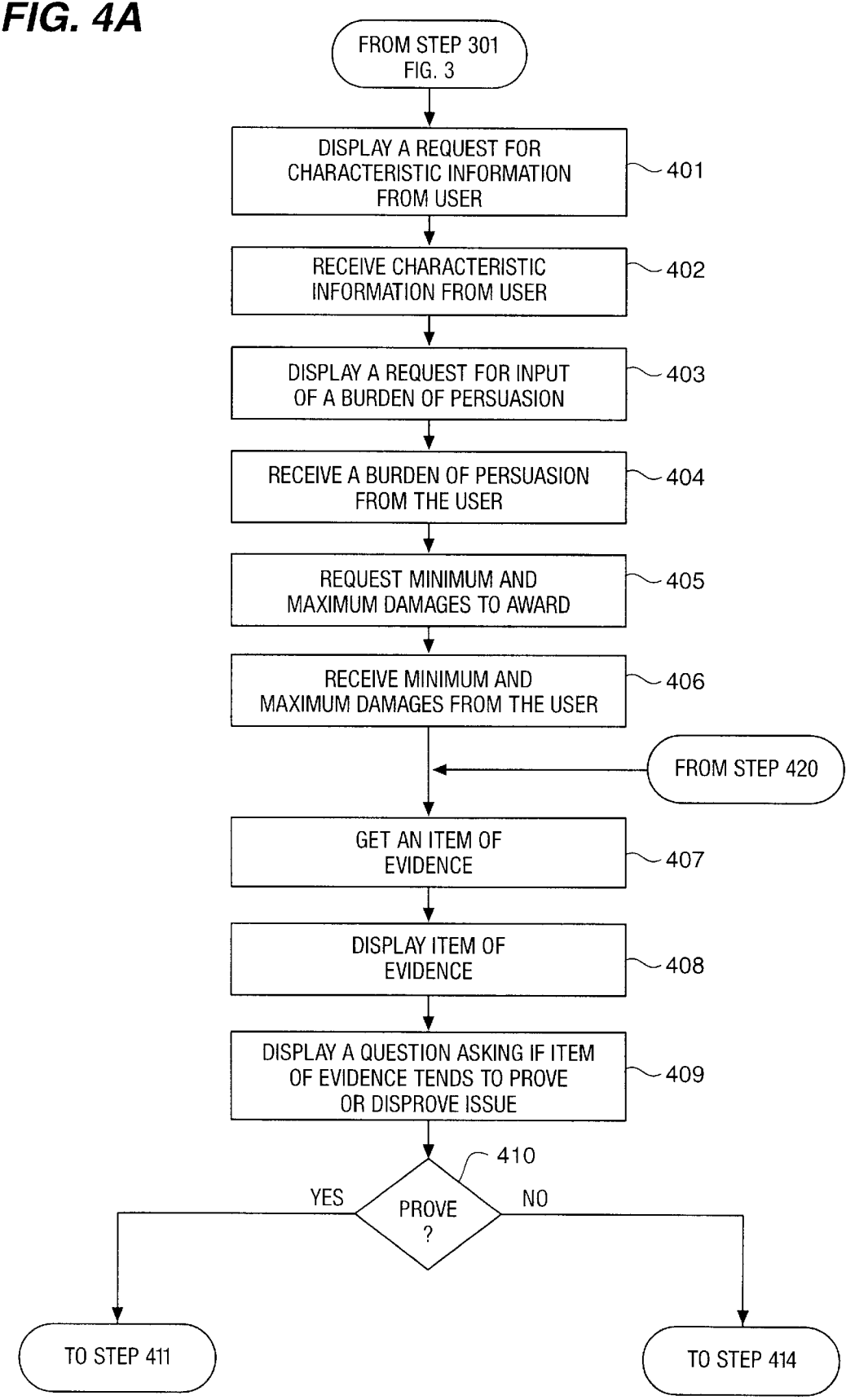
FIGS. 4A and 4B illustrate a preferred exemplary process for interrogating a user for data about a trial.
Figure 4B:
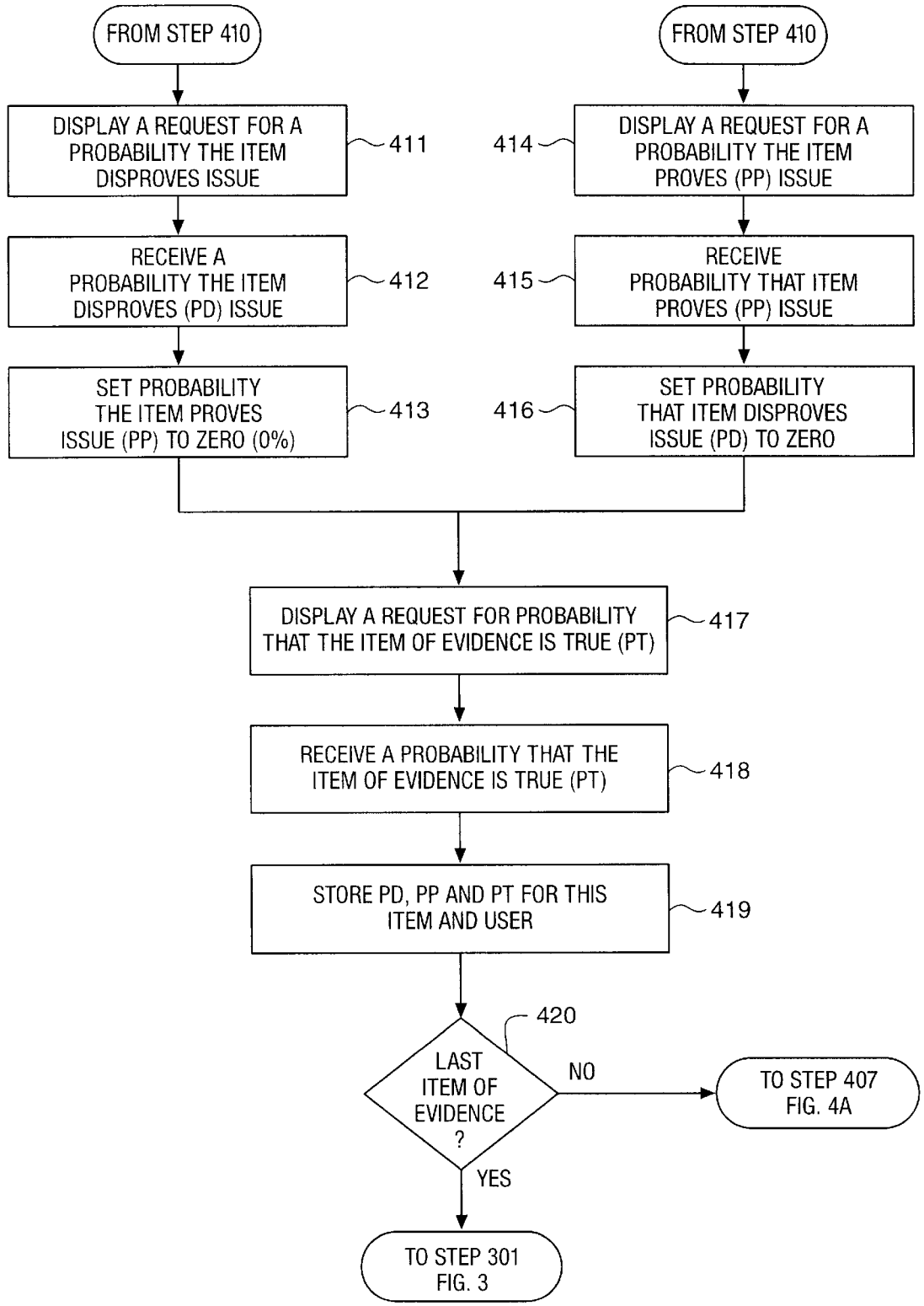

A Process for Interrogating a User—FIG. 4

FIG. 4 illustrates process 400 of the preferred embodiment for interrogating a user to get data needed to predict the outcome of a trial and to compare the user's opinion about the trial with opinions of other users of the preferred embodiment. Interrogation process 400 begins in step 401 by displaying a request to the user for characteristic information about the user. The characteristic information comprises the user's opinions about a wide variety of subjects and demographic information which includes but is not limited to the name, age, race, religion, and occupation of the user. In step 402, the characteristic information input by the user is received and stored in order to perform future comparisons with the characteristic data of other users.

In step 403, process 400 begins to request information about the trial. First, a request for the users opinion about the burden of persuasion in probability terms in requested in step 403. The display of step 403 may also contain an explanation that the burden of persuasion is the percentage of surety in the evidence needed to prove a fundamental issue of the trial. In step 404, the burden of persuasion input by a user is received and stored for use in determining how a user would vote in the verdict of the trial. A display requesting a minimum amount of damages (Q1) and a maximum amount of damages (Q2) that the user would award is displayed to the user in step 405. The maximum and minimum amount of damages from the user are received in step 406. The request in step 405 is displayed only if the trial is a civil trial for monetary damages. If the trial is a criminal trial, steps 405 and 406 may be used to determine a length of a sentence for the defendant or the step may be skipped entirely.

The following steps 407–420 are repeated in an iterative loop to collect data from the user about each item in evidence. In step 407, an item of evidence is retrieved from a list of items in evidence at the trial. The item of evidence is displayed to the user in step 408. In step 409, a question is displayed the user asking whether the item of evidence tends to prove or disprove the fundamental issue in the trial. The fundamental issue in a trial varies depending on the type of case. For example, the fundamental issue in a criminal trial is whether the defendant committed the crime and in a civil trial the fundamental issue may be whether the defendant is liable for damages to the plaintiff. In step 410, the input of the user is received and if the user responds that the item of evidence tends to prove the fundamental issue then process 400 proceeds to step 414.

If the item of evidence tends to disprove the fundamental issue, process 400 goes to step 411. In step 411, process 400 displays a request for a probability that the item, if true, disproves the fundamental issue. In step 412, process 400 receives the probability that the item of evidence disproves the fundamental issue(PD). The probability that the item, if true, proves the fundamental issue (PP) is set to zero in step 413.

If the user inputs that the item of evidence tends to prove the fundamental issue of the trial, process 400 executes step 414. In step 414, process 400 displays a request for the user to input a probability that the item of evidence, if true, proves the fundamental issue of the trial (PP). The input from the user of the probability that the fundamental issue is proved is received in step 415. In step 416, the probability that the fundamental issue is disproved is set to zero.

After step 413 or step 416, process 400 proceeds to step 417 and displays a request for a probability that the item of evidence is true (PT). In step 418, process 400 receives a probability an item of evidence is true (PT) input by the user. In step 419, process 400 stores the probability that item of evidence, if true, proves the fundamental issue (PP), the probability that the item of evidence, if true, disproves the fundamental issue (PD), and the probability that the item of evidence is true (PT) for future use. One possible method for storing the user input data is to create a database that stores all of the characteristic data about a user, all of the values that user inputs, and all of the results of calculations on the data received by the user.

In step 420, process 400 determines if the item of evidence displayed is the last item of evidence in the list of items. If the item of evidence is not the last item of evidence, process 400 returns to 407 and repeats steps 407–420 for another item of evidence. If the displayed item of evidence is the last item of evidence, process 400 returns to step 301 of FIG. 3.

Figure 5:
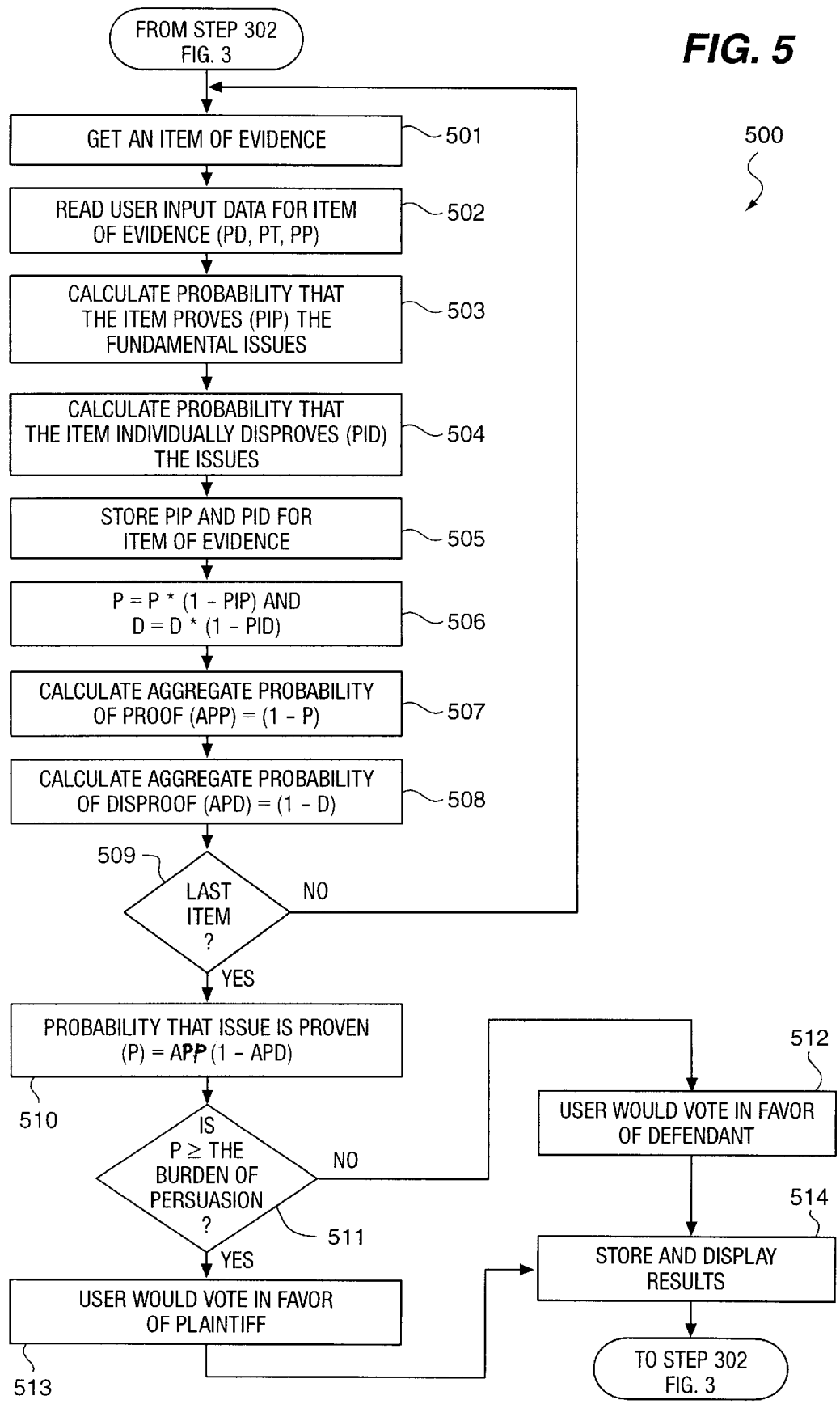
FIG. 5 illustrates a preferred exemplary process for predicting a possible outcome of a trial based upon data input by a user.

Process for Predicting the Outcome of the Trial Based Upon Data Input by the User—FIG. 5

After the user has been interrogated for all of the information required in step 301, step 302 performs process 500, illustrated in FIG. 5, to predict the outcome of the trial. Process 500 begins an iterative loop in step 501 which is performed for each item of evidence. In step 501, an item of evidence is read from the list of items of evidence. In step 502, the user inputs values for the probability that the read item of evidence, if true, proves the fundamental issue (PP), the probability that the read item of evidence, if true, disproves the fundamental issue (PD), and the probability that the item of evidence is true (PT) are read from memory.

In step 503, the probability that the item, if true, individually proves the fundamental issue of the trial (PIP) is calculated by multiplying the probability that the item proves the fundamental issue (PP) by the probability that the item of evidence is true (PT). In step 504, the probability that the item, if true, individually disproves the fundamental issue of the trial (PID) is calculated by multiplying the probability that item disproves the fundamental issue (PD) by the probability that the item of evidence is true (PT). In step 505, the values calculated in steps 503 and 504 are stored for future use. The temporary values used to calculate the aggregate probabilities of proof and disproof are updated in step 506 by making proof (P)=P*(1−PIP) and disproof (D)=D*(1−PID). In the first iteration of the loop of steps 501 to 509, P and D are initialized to be equal to 1.

The temporary value for proof (P) calculated in step 506 is used in step 507 to calculate the aggregate probability that the items of evidence prove the fundamental issue of the trial (APP) which is expressed as 1−P. The aggregate probability that the items of evidence disprove the fundamental issue of the trial (ADP) is calculated in step 508 by the expression 1−D which one minus the temporary value of disproof (D).

In step 509, process 500 determines if the current item of evidence is the last item of evidence in the list of items of evidence. If the current item is not the last item of evidence, process 500 repeats the item loop starting at step 501 by reading the next item of evidence in the list. If the current item is the last item in the list of items of evidence, the probability that the fundamental issue has been proved (P) is calculated in step 510 by multiplying the aggregate probability that the fundamental issue is proved by one minus the aggregate probability that the fundamental item of evidence is disproved which is expressed as P=APP*(1−APD). The above calculations are based on an equation that is a reduction of the Poincare method for determining the probability of an alternative of events based upon a number of random events. However, the process is based upon the assumption that the items of evidence are independent from one another. Independent meaning that the fact that one item of evidence is true does not effect the probability that another item of evidence is true. If a maker of the present invention decides that the probabilities of the items of evidence are dependent, the design could be modified so that the above application can perform the Poincare formula for determining the probability of an event based upon random factors that are dependent.

In step 511, the burden of persuasion is compared to the probability that the fundamental issue has been proved. If the probability the fundamental issue has been proved is greater than the burden of persuasion, the user would vote in favor of the plaintiff as shown in step 512. If the probability the fundamental issue has been proved is not greater than the burden of persuasion, the user would not vote in favor of the plaintiff as shown in step 513. In step 514, the results from process 500 are stored and displayed to the user. Process 500 ends by returning to step 302 of FIG. 3.

Figure 6:
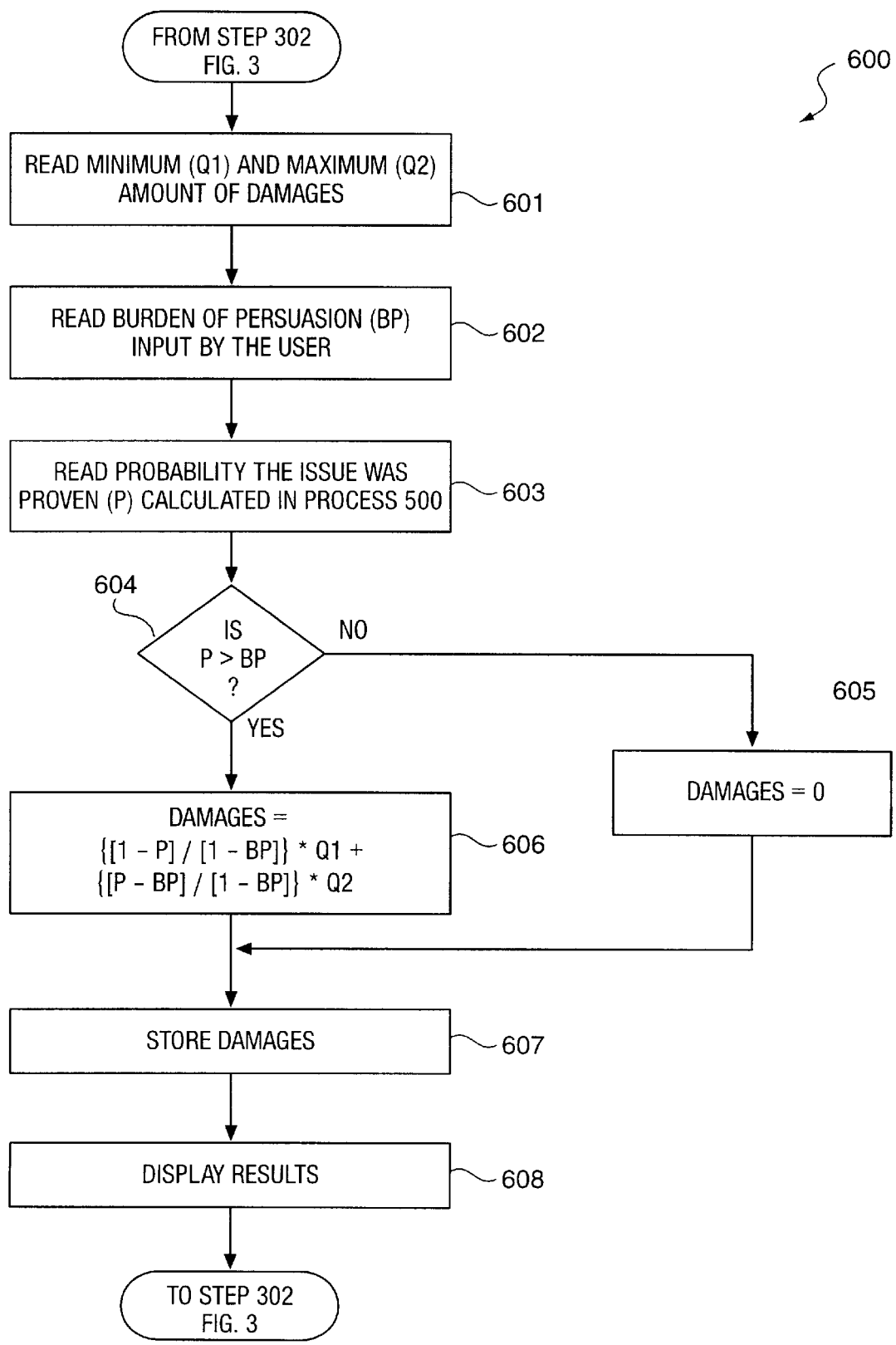
FIG. 6 illustrates a preferred exemplary process for determining the amount of damages to award based upon a user's data.

Process for Determining the Amount of Damages to Award—FIG.6

In civil trials, a trial ends with the awarding of damages based on the fault of the defendant. Process 600 is illustrated in FIG. 6 and determines the amount of damages to award based on the probability that the fundamental issue (liability of the defendant) has been proved. Process 600 begins in step 601 by reading the maximum amount (Q2) and the minimum amount (Q1) of damages that the user would award. In step 602, the burden of persuasion in terms of probability as given by the user is read and the probability that the fundamental issue has been proved is read in step 603. The probability that the fundamental issue of the trial has been proved is compared to the burden of persuasion in step 604. If the probability that the fundamental issue has been proved is not greater than the burden of persuasion, the amount damages are set equal to zero in step 605 because the plaintiff has not proved that the defendant is liable. If the probability that the fundamental issue has been proved is greater than the burden of persuasion, the damages are awarded are calculated in step 606 according to the following equation:

$$\text{Damages} = \{[1-P]/[1-BP]\}*Q1 + \{[P-BP]/[1-BP]\}*Q2$$

where:

P=probability that the fundamental issue has been proved;
BP=Burden of Persuasion;
Q1=minimum amount of damages that would be awarded; and Q2=maximum amount of damages that would be awarded.

This is a linear relationship between the amount of damages and the probability that liability has been proved. After step 605 or step 606, the damages are stored in step 607 for future use in other processes. Alternatively, process 600 could also be used to determine a sentence. The amount of damages calculated are then displayed to the user in step 608 and process 600 ends by returning to step 302 of process 300 illustrated in FIG. 3.

Figure 7:
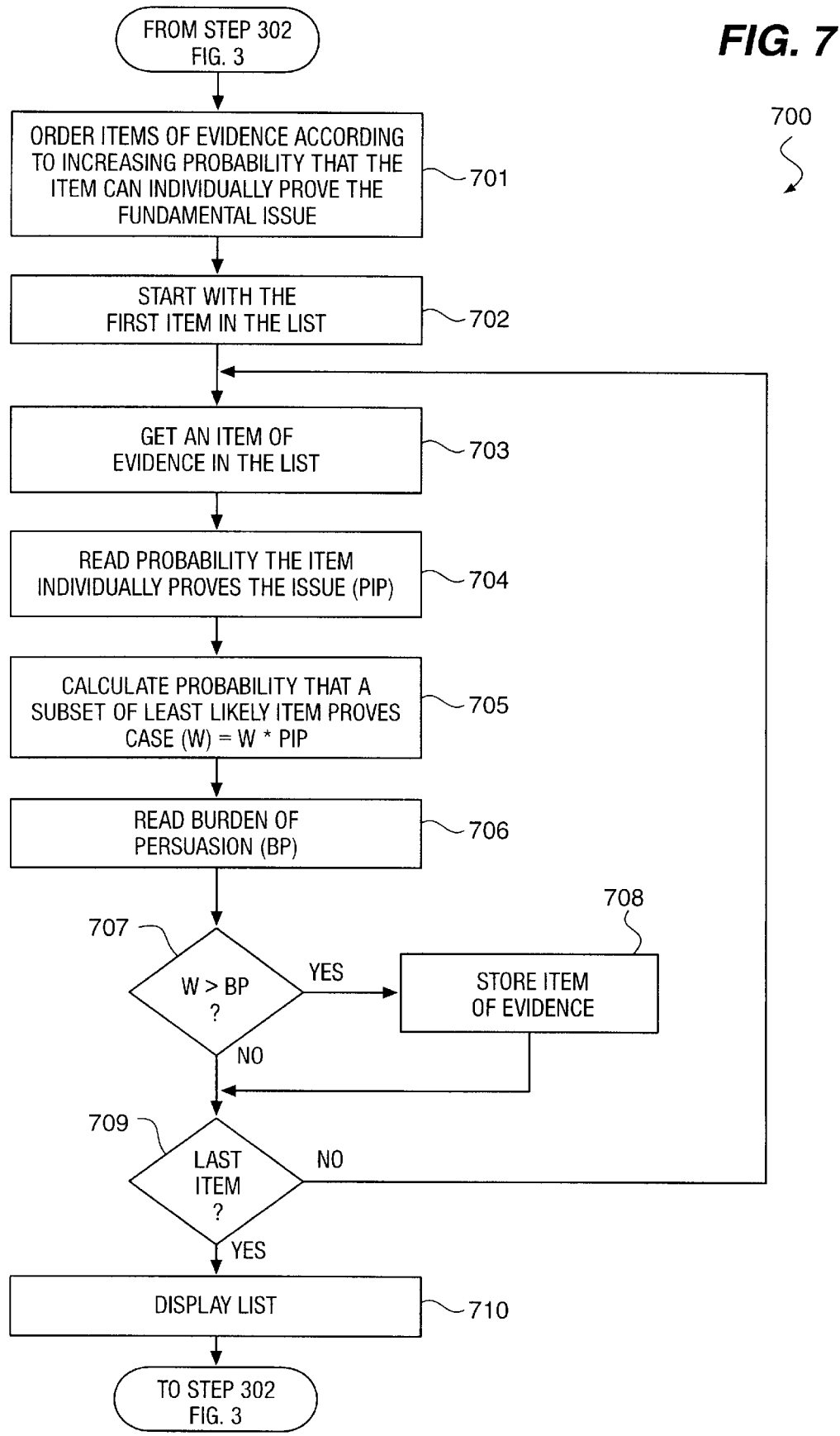
FIG. 7 illustrates a preferred exemplary process for ordering the items in evidence in a list based upon the probability that the one item alone proves the fundamental issue in the trial.

A Process for Ordering the Items of Evidence in Increasing Probability That the Item Individually Proves the Fundamental Issue of the Trial—FIG. 7

In order for the user to view the items in order of increasing importance to the user, process 700 orders the items in evidence in a list according to the increasing probability that the item individually proves the fundamental issue of the trial. Process 700 also determines the subset of the weakest items of evidence that will combine prove the fundamental issue of the trial. Process 700 begins in step 701 by ordering the items of evidence in a list according to increasing probability that the item can individually prove the fundamental issue of the trial. Any sorting method such as a bubble sort can be used to arrange the list.

In step 702, an iterative process is started with the first item of evidence in the ordered list from step 701. In step 703, an item from the ordered list is read. In step 704, the probability that each item, if true, individually proves the fundamental issue (PIP) is read. The probability that the subset of all items in the list that have been read (W) is calculated by multiplying the old probability of that the subset proves the fundamental issue (W) by the probability that the current item individually proves the fundamental issue (PIP) in step 705.

In step 706, the burden of persuasion is read and in step 707, the burden of persuasion is compared to the probability that all of the items from that list that have been read prove the fundamental issue of the trial. If the probability of the subset is greater than the burden of persuasion, the current item read from the list is stored as the item that designates the weakest subset in step 708. If the probability is not greater than the burden of persuasion, process 700 determines if the current item is the last item in the list in step 709. If the current item is the last item in the list or after the weakest subset is determined in step 708, process 700 displays the ordered list of items of evidence and indicates which subset of ordered items of evidence does not cumulatively prove the fundamental issue of the trial. Process 700 ends by returning to step 302 of FIG. 3.

Processes for Comparing a User's Data and Results to Data and Results of Other Users—FIGS. 8–11

Figure 8:
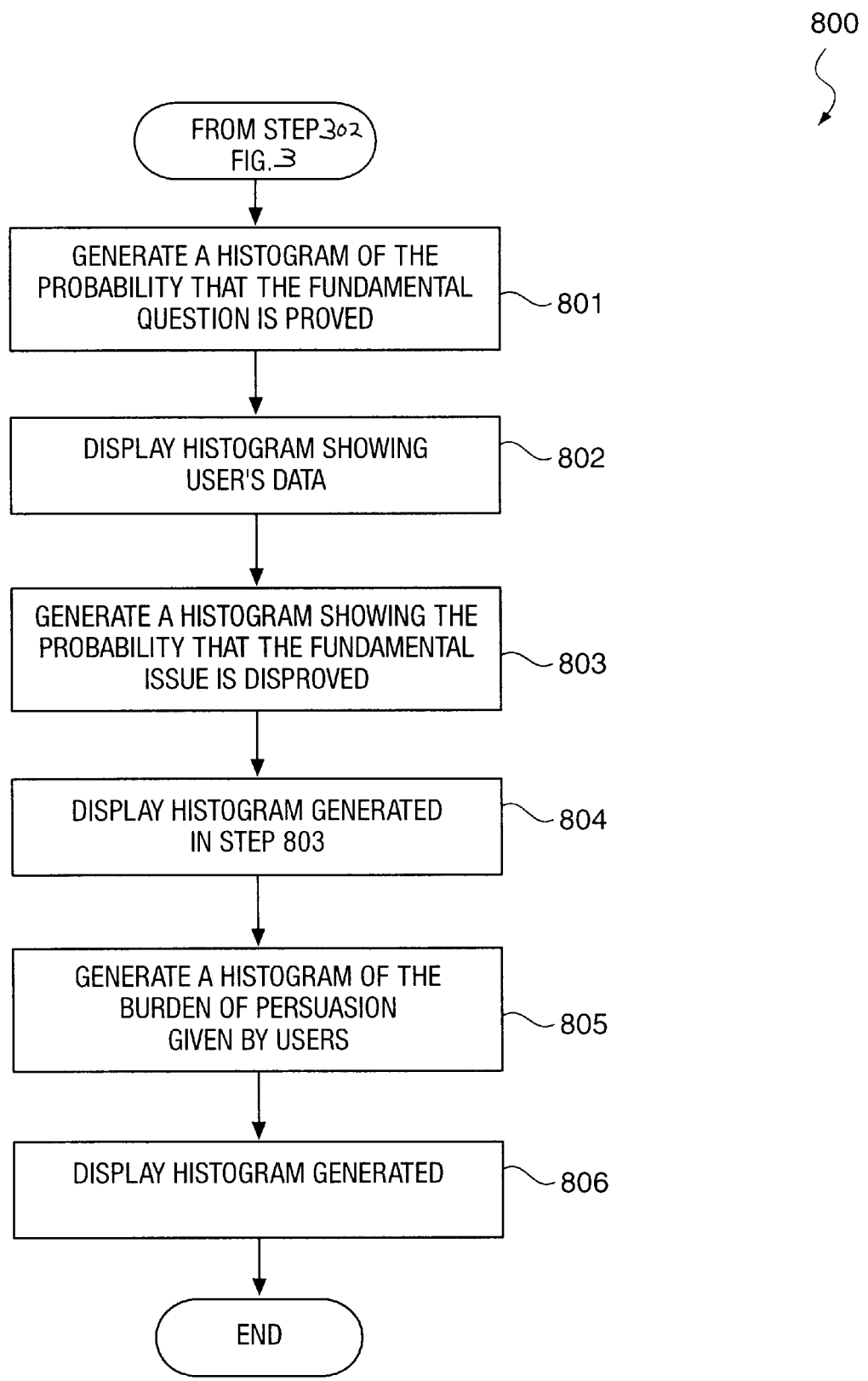
FIG. 8 illustrates a preferred exemplary process for comparing data input by the user to data input by other users.

Process for Generating Graphical Comparisons of Users—FIG. 8

One manner of comparing data from many users is through graphical depictions of data and a preferred method for graphically displaying data from many users is the use of histograms. FIG. 8 illustrates a process that generates histograms for different categories of data that are input by the user and calculated by the other processes provided by the present invention. The histograms developed in each step of FIG. 8 are generated using the histogram generating process described below and illustrated in FIG. 9.

Process 800 begins in step 801 by generating a histogram of all of the calculated probabilities that the fundamental issue of the trial has been proved (P) by the item in evidence. In step 802 the histogram of 801 is displayed to the user. In step 803, process 800 generates a histogram of all the calculated probabilities that the fundamental issue of the trial was disproved by the evidence. The histogram generated in step 803 is displayed to the user in step 804. In step 805, a histogram of the burden of persuasions input by the users is generated. The histogram of the burden of persuasion is displayed is step 806. Process 800 ends by returning to step 303 of FIG. 3.

Figure 9:
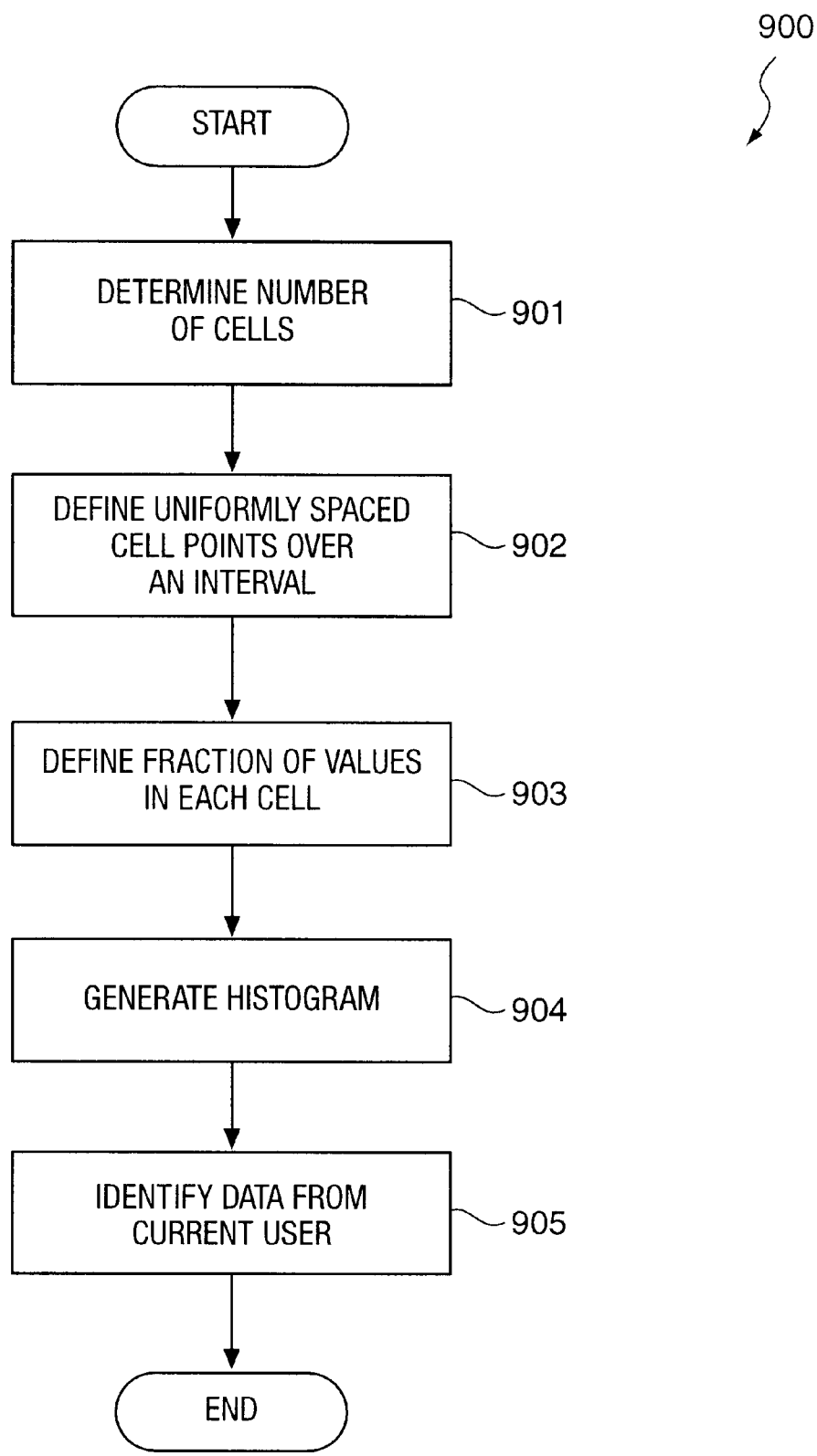
FIG. 9 illustrates a preferred exemplary process for generating a histogram of data.

Process for Generating a Histogram—FIG. 9

FIG. 9 illustrates a process 900 for generating a histogram for steps 801,803, and 805 of FIG. 8. Process 900 begins in step 901 by determining the number of cells in the histogram. This is typically a designer's choice. In step 902, cell points are spaced uniformly space over a cell interval. The fractional value in each cell is determined in step 903. In step 904, the histogram is generated from the data being used. In step 905, the data from a desired user is identified on the histogram.

Figure 10:
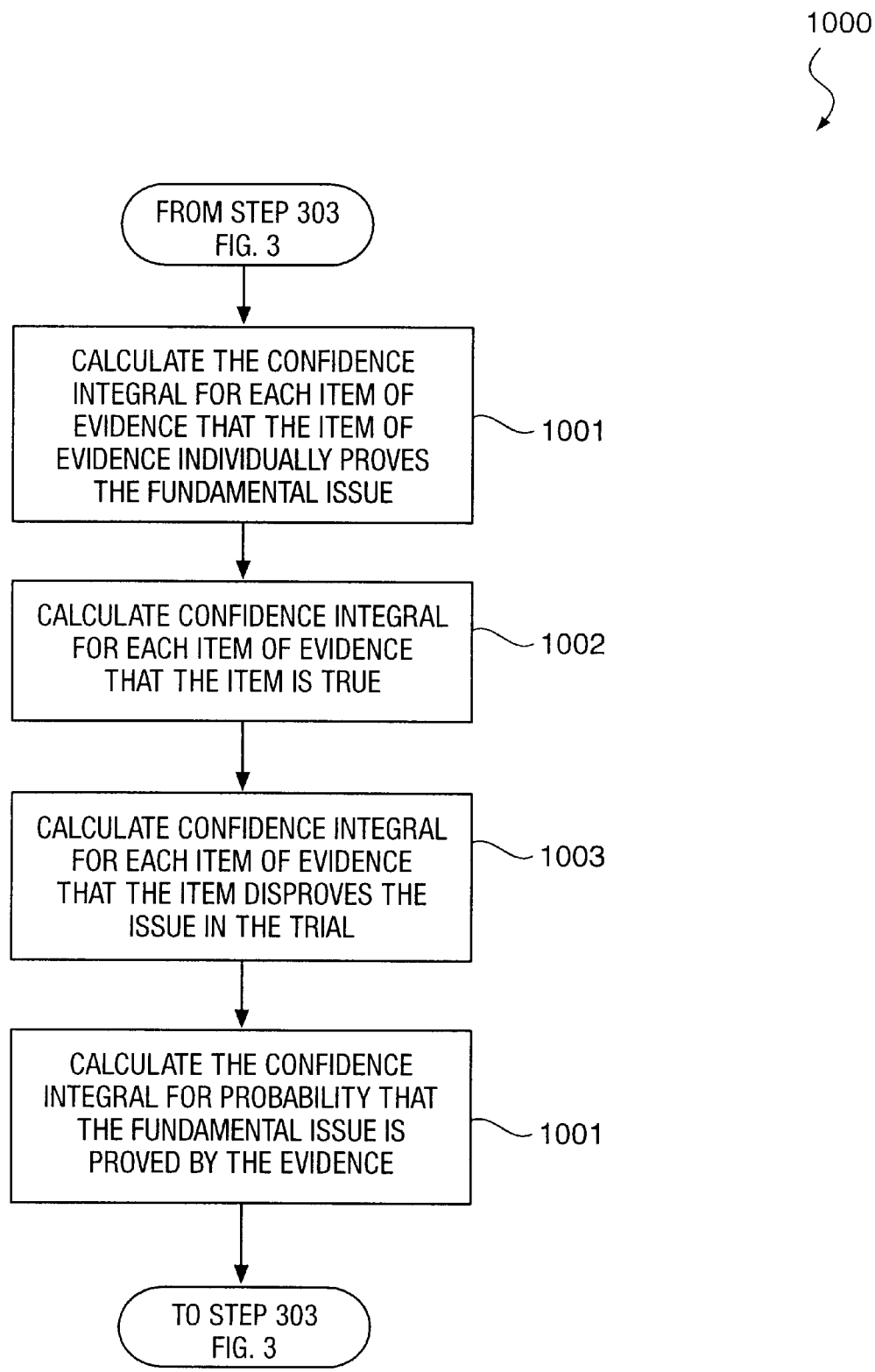
FIG. 10 illustrates a preferred exemplary process for predicting the probable outcome of a trial based upon data input by a plurality of users.

Process for Calculating the Means, the Confidence Intervals for the User Data and Calculated Results—FIG. 10

In process 1000 illustrated in FIG. 10, the confidence limits for data input by the users and for probabilities calculated by other processes are determined to show mean probabilities for the data and to show a range of variance among users. Process 1000 begins in step 1001 which calculates a confidence interval for each item of evidence that the item of evidence individually proves the fundamental issue of the trial. In step 1002, a confidence interval is calculated for each item of evidence that the item of evidence is true. A confidence interval that each item of evidence disproves the fundamental issue of the trial is calculated in step 1003 and a confidence interval for the calculated aggregate probability that the items of evidence prove the fundamental issue of the trial is calculated in step 1004. Process 1000 then returns to step 303 of FIG.3.

Figure 11:
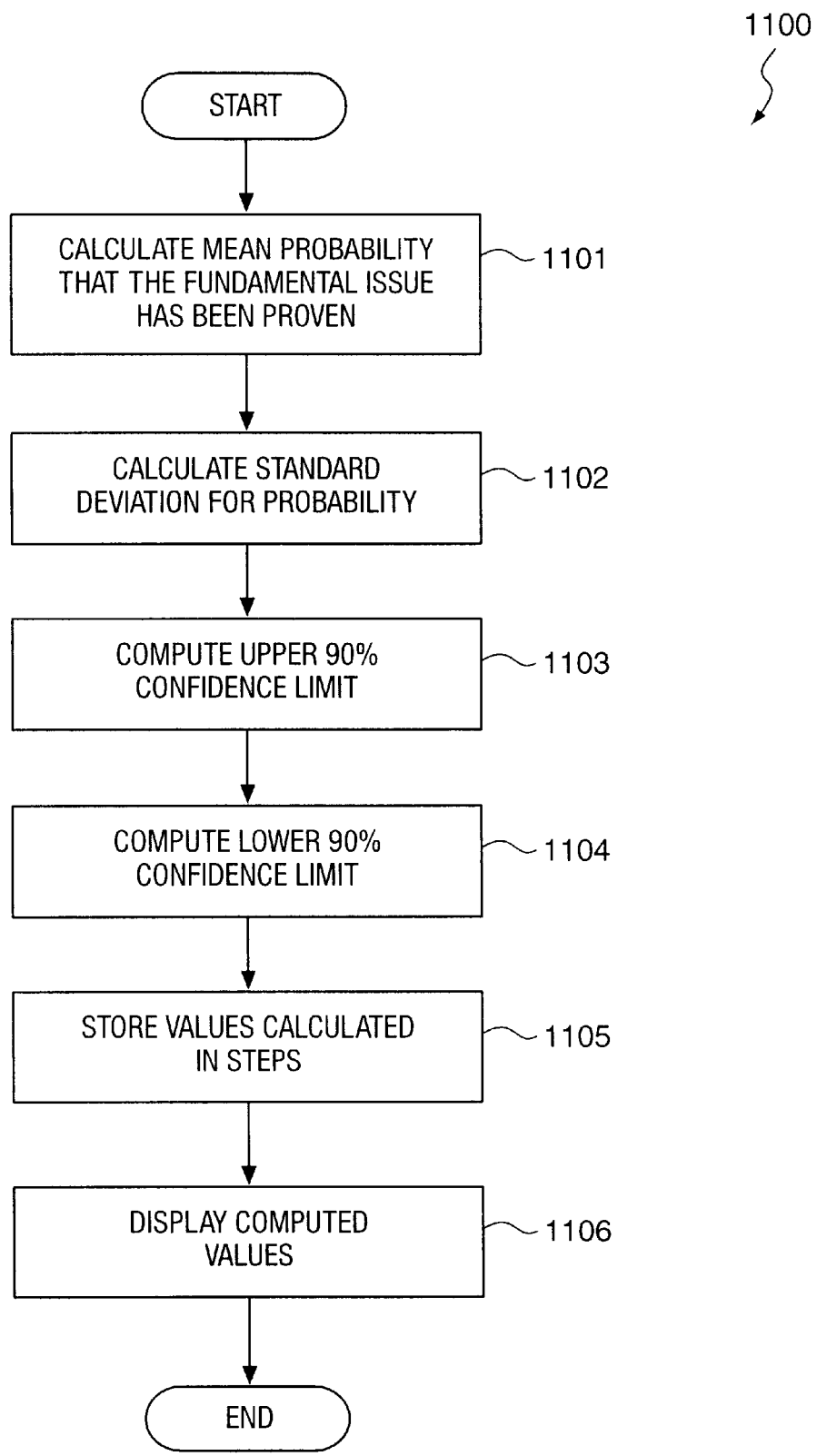
FIG. 11 illustrates a preferred exemplary process for determining the accuracy of the probable outcome of the trial based upon data from a plurality of users.

Process for Determining the Confidence Limits of the Data Received From Users—FIG. 11

In order to determine the certainty of a determination of the outcome of a trial based on data input by many users, process 1100 performs the function of calculating the confidence limits as required to find the confidence intervals for steps 1001–1004 of process 1000. Process 1100 begins in step 1101 by calculating the mean of the probabilities for the data being tested. In step 1102, the standard deviations for the probabilities are determined. After the standard deviations have been calculated, upper 90% confidence limit is calculated in step 1103. In step 1104, the lower 90% confidence limit is calculated. The mean and the calculated upper and lower 90% confidence limits are stored for future use in step 1105 and are displayed in step 1106. In the above steps, the confidence limits are 90%. However, any other limit may be used depending upon the certainty required by the user. The confidence limit is defined as the level of significance desired multiplied by 2. As will be seen below, the level of significance is 5% in the preferred embodiment therefore the confidence limits are 90% in process 1100.

Figure 12:
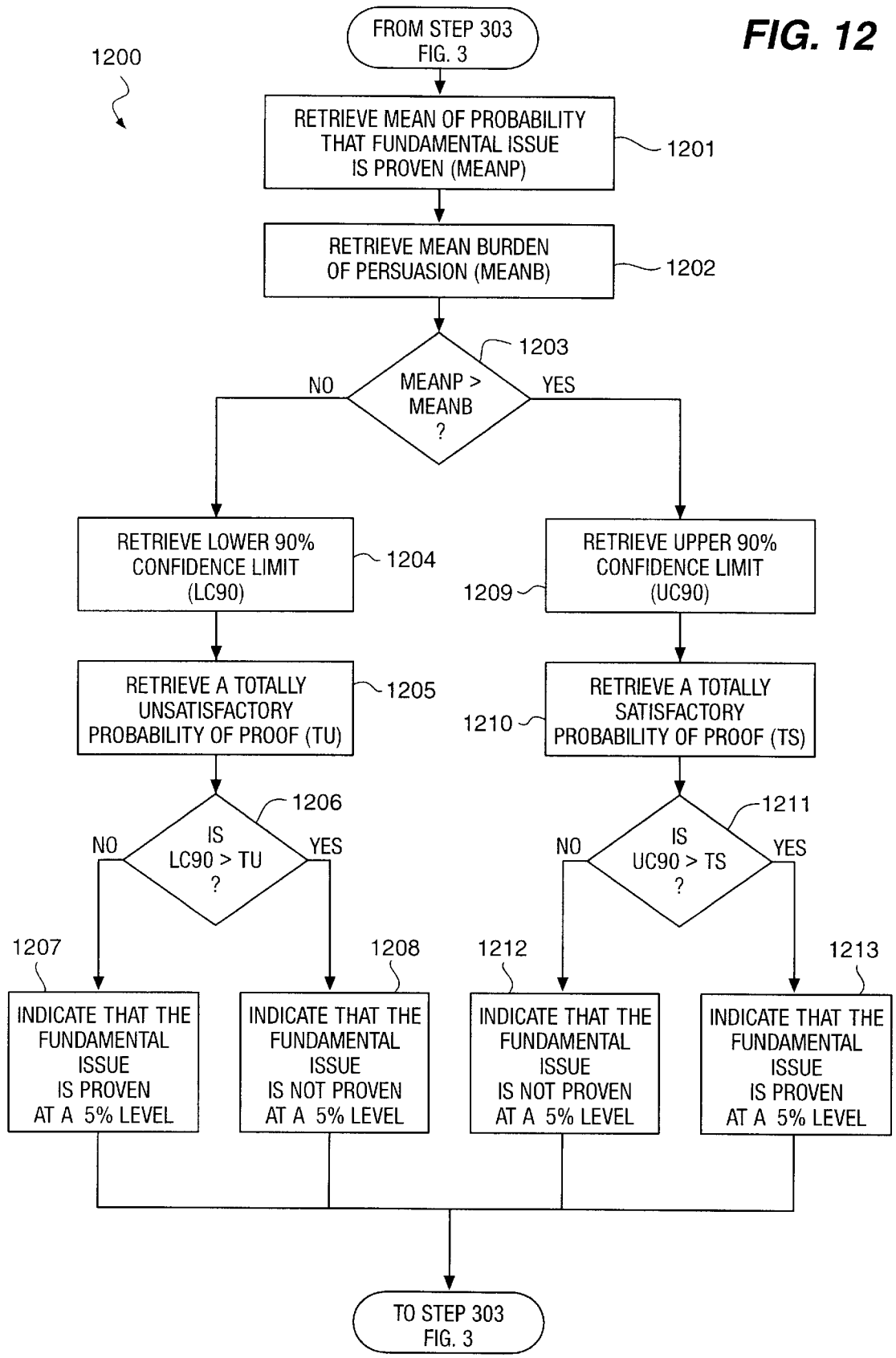
FIG. 12 illustrates a preferred exemplary process for determining the probability of rejecting a hypothesis that should be rejected.

Process for Determining the Probability That a Hypothesis Should be Rejected—FIG. 12

After the confidence interval for the aggregate probability that the items of evidence prove the fundamental issue of the trial have been calculated, process 1200 determines whether a verdict based upon the mean probability that the issue is proved is reliable. Process 1200 begins in step 1201 by retrieving the mean probability that the items of evidence prove the fundamental issue. In step 1202, the mean for the burden of persuasion is retrieved. The mean probability of proof and the mean of the burden of persuasion are compared in step 1203.

If the mean probability of proof is greater that the mean burden of persuasion in step 1203, the lower 90% confidence limit for the probability of proof (LC 90) is retrieved in step 1204 and a probability that proof is totally unsatisfactory (TU) is retrieved in step 1205. The lower 90% confidence limit and the probability of a totally unsatisfactory result are compared in step 1206. If the lower 90% confidence limit is not greater than the probability of being totally unsatisfactory, process 1200 indicates that the fundamental issue has been disproved at a 5% significance level in step 1207. If the lower 90% confidence level is greater than the probability of being totally unsatisfactory, process 1200 indicates the fundamental issue is not disproved at a 5% significance level in step 1208. If the mean probability of proof is greater than the mean burden of persuasion, the upper 90% confidence level for the aggregate probability that fundamental issue has been proved is retrieved in step 1209 and the probability that the fundamental issue is satisfactorily proved is retrieved in step 1210. In step 1211, the upper 90% confidence level and the totally satisfactory probability are compared. If the upper 90% confidence limit is not greater than the totally satisfactory probability, process 1200 indicates that the fundamental issue of the trial has not been proved at a 5% significance level in step 1212. If the upper 90% confidence limit is greater than the totally satisfactory probability, process 1200 indicates that the fundamental issue of the trial is proved at a 5% significance level in step 1213. After step 1207,1208, 1212, or 1213, process 1200 returns to step 303 of FIG. 3.

Figure 13:
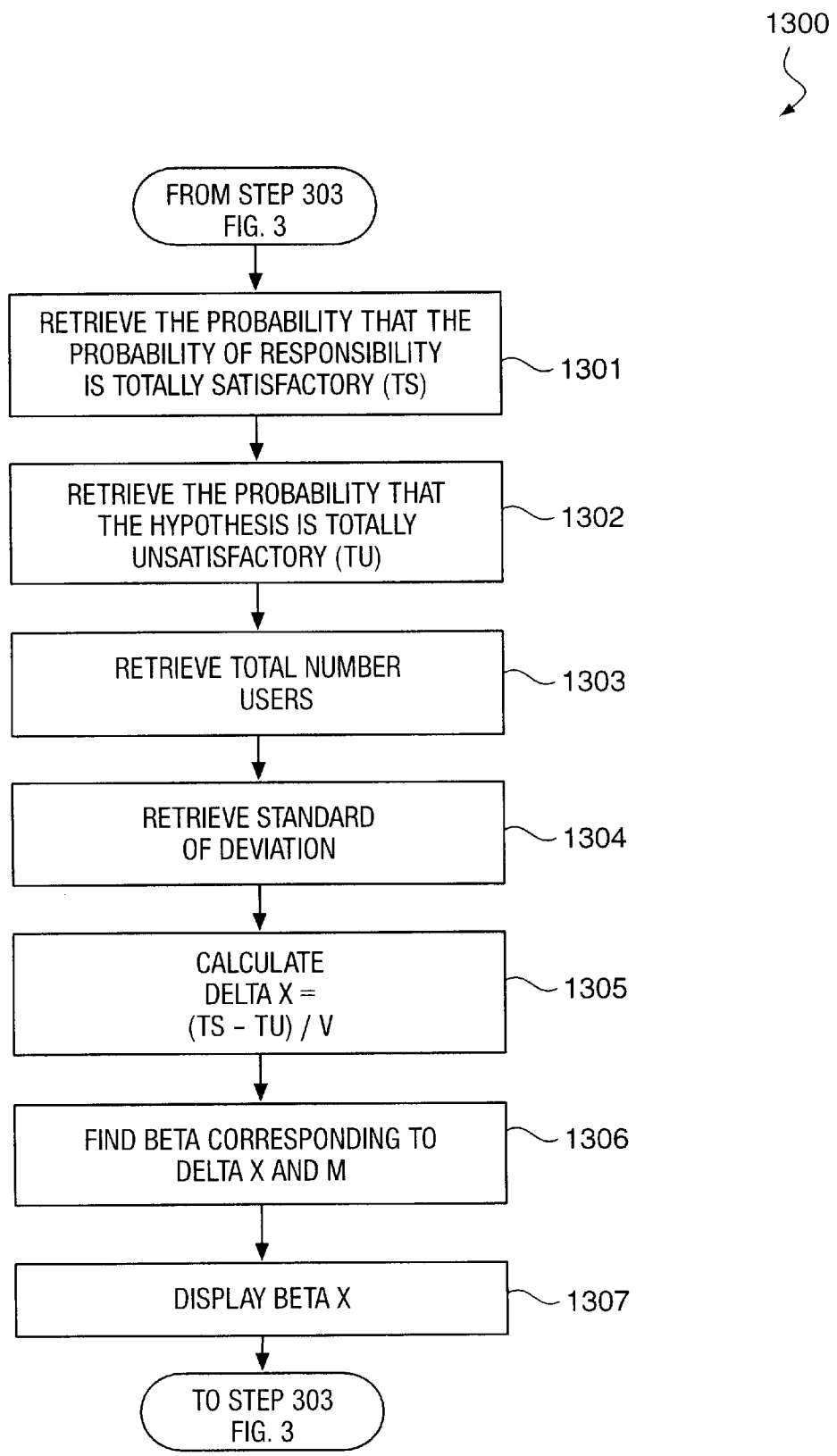
FIG. 13 illustrates a preferred exemplary process for determining the probability of rejecting a hypothesis that should be accepted.

Process for Determining the Probability of Rejecting a Hypothesis that Should Be Accepted—FIG. 13

In process 1300 illustrated in FIG. 13, the probability that the defendant is totally not liable or guilty is calculated. Process 1300 begins in step 1301 and 1032 with the retrieving of the probabilities that the fundamental issue is totally satisfactorily proved and totally unsatisfactorily proved. In step 1303, the probabilities retrieved in steps 1301 and 1302 as well as the standard deviations calculated above are used to calculate deltax which is an abscissa of graphs showing probabilities based upon a known statistical distribution such as the Student t is used. The total number of users is retrieved in step 1303 and the beta curves are retrieved in step 1304. In step 1305, the location of deltax on a beta curve for a specified user is calculated. In step 1306, betax is determined. Betax is the calculated probability that the defendant is totally not responsible. In step 1307, the results are displayed to the user and in step 1308 the results are stored for future use.

Figure 14:
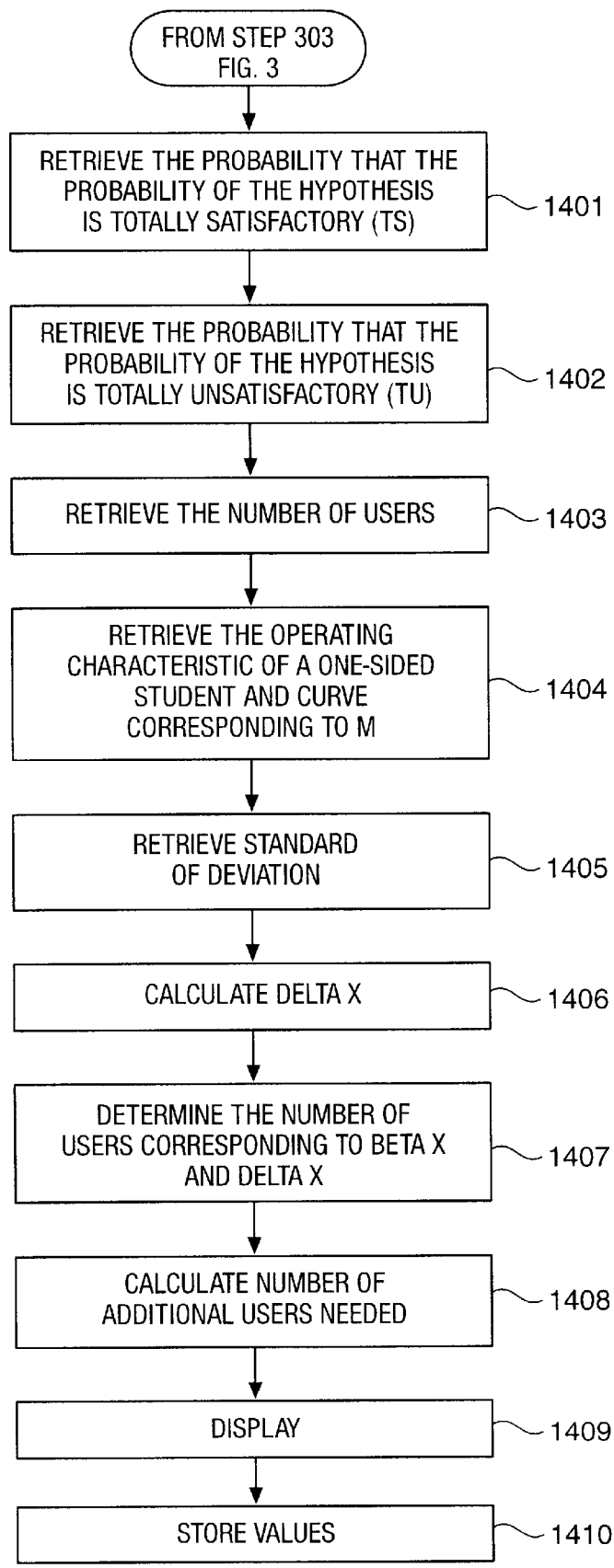
FIG. 14 illustrates a preferred exemplary process for determining a number of additional users required to obtain the desired probability of rejecting a hypothesis that should be accepted.

Process for Determining the Number of Additional Users Required to Obtain the Desired Probability of Rejecting a Hypothesis That Should Be Accepted—FIG. 14

Process 1400 illustrated in FIG. 14 is a process that uses the collected data to determine the number of additional users that are required to make the collective verdict of all the users acceptable. Process 1400 begins in steps 1401 and 1402 in which the probabilities that a result is Totally Satisfactory (TS) and that a result is Totally Unsatisfactory (TU) are retrieved. The total number of users is retrieved in step 1403. In step 1404, the operational characteristics of a one-sided Student t curve corresponding to the number of users. The standard deviation is retrieved in step 1405 and deltax is calculated in step 1406. In step 1407, the number of users corresponding to a particular beta which is 10% in the preferred embodiment, is determined. Although, it is known that any number may be used for data. The number of additional users is calculated in step 1408. The result is then displayed in step 1409. Process 1400 is completed in step 1410 by storing the calculated values.

Comparisons of User Characteristics, Results, and User Input Data

Figure 15:
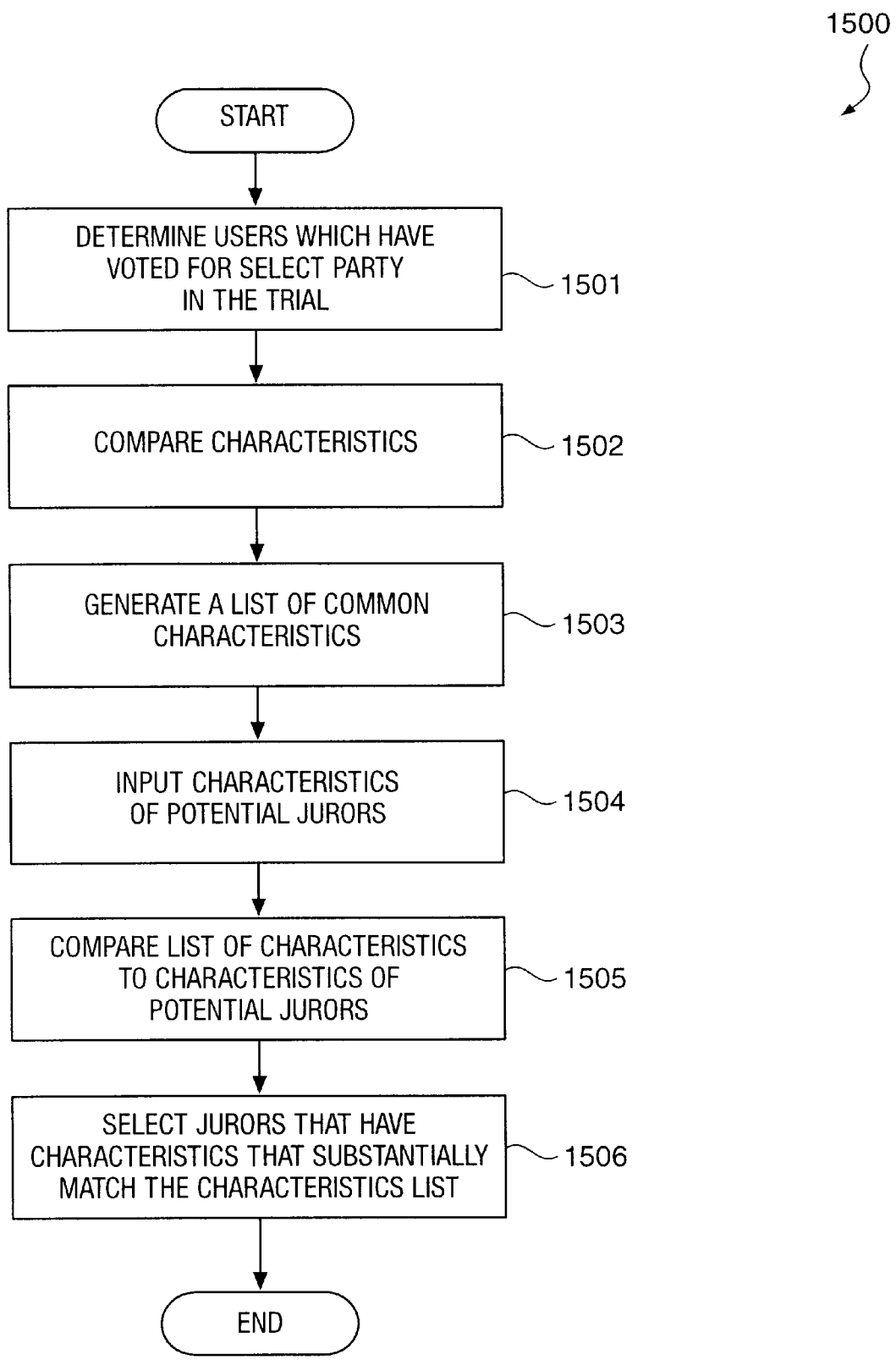
FIG. 15 illustrates a process for selecting potential jurors.
Figure 16:
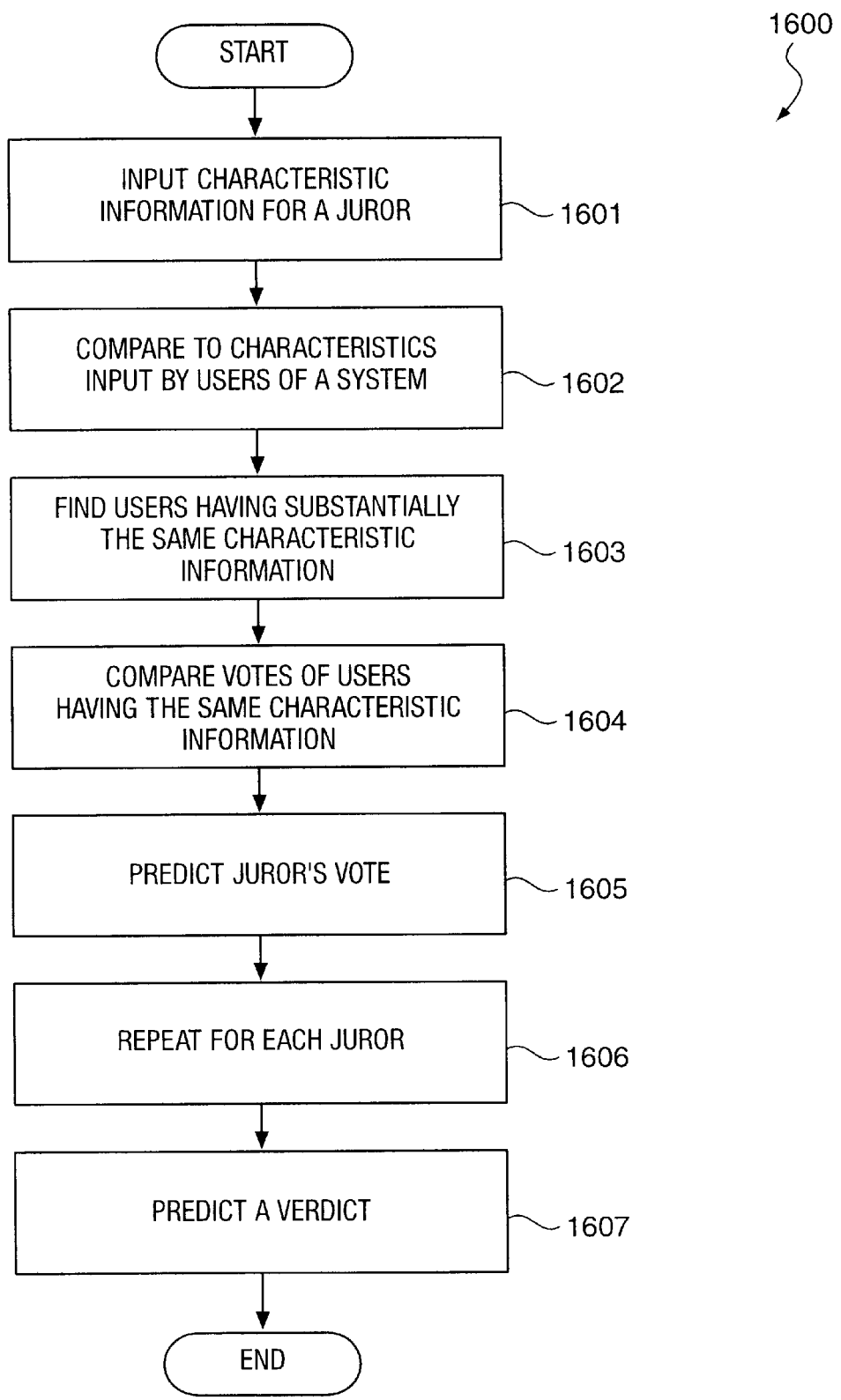
FIG. 16 illustrates a process for predicting a vote of a jury.

One advantage of the present invention is that characteristic data from each user can be matched to the input of the user and the results calculated by the processes of the present invention. This allows an administrator to determine the characteristics of a user that may affect the input of a user and to predict how a subsequent user may feel about an item of evidence. FIGS. 15 and 16 are two examples of processes that use these types of comparisons to predict how a person with similar characteristics may feel about items of evidence in a trial.

Process for Selecting Potential Jurors—FIG. 15

Process 1500 as illustrated in FIG. 15 uses the data collected from the users of the system and the results based on calculations using the collected data to find good potential jurors for a party to a trial. More specifically, process 1500 could be used to determine how each potential juror will view each item of evidence. Process 1500 begins in step 1501 which users of the system that would vote for a particular side in the trial. In step 1502, the characteristic information for the selected users is compared. A list of common characteristic data is generated in step 1503. In step 1504, characteristic data of potential jurors is input. The characteristic information in the list and of the potential jurors is compared in step 1505 and in step 1506, jurors having the most traits in common with the list of characteristic information are selected.

Process for Predicting How a Jury in a Trial Will Vote—FIG. 16

FIG. 16 illustrates process 1600 which predicts how a juror judging a trial will vote. Process 1600 begin in step 1601 by inputting the characteristic information about the juror. The input characteristic information is compared to the characteristic information from each of the users of the system in step 1602. In step 1603, process 1600 finds users having substantially the same characteristic information as the juror. In step 1604, the votes of the users as well as other data are compared. In step 1605, the comparisons in step 1604 are used to determine the probable vote of the juror. Process 1600 is repeated for each juror in step 1607. In step 1608, the vote of each juror is used to determine the probable verdict of the jury.

The above description is one preferred exemplary embodiment of a system for predicting the probable outcome of a trial based on user input data. It is expected that those skilled in the art can and will design systems that infringe on the system described in the below claims either literally or through the doctrine of equivalents.

What is claimed is:

1. System for determining whether items of evidence prove a conclusion based upon user input comprising:

means for storing a list of items of evidence;

means for displaying each said item in evidence from said list to said user;

means for receiving input from said user comprising a truth probability for each said item of evidence wherein said truth probability is the probability that said item is true, and a proof probability for each said item of evidence wherein said proof probability that an item proves said conclusion;

means for determining a calculated probability that said comparison for determining if said conclusion is true; and means responsive to a determination whether said conclusion if true for displaying said determination to said user.

2. The system of claim 1, further comprising:
means for determining a conclusion probability for each item of evidence that said each item individually proves said conclusion from said true probability and proof probability of said each item of evidence; and
means for storing said conclusion probability that each said item of evidence individually proves said conclusion.

3. The system of claim 2 further comprising:
means for generating an ordered list of items of evidence based upon said conclusion probability for each of said items of evidence; and
means for storing said ordered list in said memory.

4. The system of claim 3 further comprising:
means for displaying said ordered list of items to said user.

5. The system of claim 2 further comprising:
means for determining a subset of said items of evidence that minimally exceeds said burden of persuasion;
means for storing said subset.

6. The system of claim 1 wherein said conclusion is a fundamental issue of a trial.

7. The system of claim 6 further comprising:
means for determining whether said user would vote in favor of a defendant in said trial from said calculated probability that said fundamental issue is proved;
means for determining whether said user would vote in favor of said plaintiff in said trial from said calculated probability that said fundamental issue is proved; and
means for storing said vote of said user.

8. The system of claim 6 further comprising:
means for calculating damages to be awarded to a plaintiff in said trial based upon said probability that said fundamental issue has been proved.

9. The system of claim 1 wherein said input by said user comprises said burden of persuasion in terms of probability.

10. The system of claim 1 wherein a plurality of users use said system, said system further comprises:
means for displaying a request for characteristic information to said user;
means for receiving an input of said characteristic information by said user; and
means for storing said characteristic information received from each of said plurality of users.

11. The system of claim 10 further comprising:
means for determining whether to accept a result from said plurality of users.

12. The system of claim 10 further comprising:
means for determining a number of additional users needed to make a result acceptable.

13. The system of claim 10 further comprising:
means for generating a histogram of said probability that said conclusion has been proved from said calculated probabilities for each of said pluralities of users.

14. The system of claim 10 further comprising:
means for determining a mean said calculated probabilities of said plurality of users.

15. The system of claim 10 further comprising:
means for generating a histogram of said probability that said conclusion is disproved from said calculated probabilities of said users that said conclusion is disproved.

16. The system of claim 10 further comprising:
means for generating a histogram of a burden of persuasion in probability as received as input from said plurality of users.

17. The system of claim 10 further comprising:
means for calculating a mean value for each said item of evidence for said truth probabilities as input by said plurality of users.

18. The system of claim 17 further comprising:
means for determining a lower confidence limit for each item of evidence that said item of evidence is true from said truth probability input by users.

19. The system of claim 17 further comprising:
means for determining an upper confidence limit for each item of evidence that said item of evidence is true from said truth probability input by users.

20. The system of claim 10 further comprising:
means for calculating a mean value for each said item of evidence that said item of evidence proves said conclusion from said proof probability input by users.

21. The system of claim 20 further comprising:
means for determining a lower confidence limit for each item of evidence that said item of evidence proves said conclusion from said proof probability input by users.

22. The system of claim 20 further comprising:
means for determining an upper confidence limit for each said item of evidence that said item of evidence proves said conclusion from said proof probability input by users.

23. The system of claim 10 further comprising:
means for calculating a mean value for each said item of evidence that said item of evidence disproves said conclusion from said proof probability input by users.

24. The system of claim 23 further comprising:
means for determining a lower confidence limit for each item of evidence that said item of evidence disproves said conclusion from said proof probability input by users.

25. The system of claim 23 further comprising:
means for determining an upper confidence limit for each said item of evidence that said item of evidence disproves said conclusion from said proof probability input by users.

26. The system of claim 10 further comprising:
means for calculating a mean value for said calculated probabilities from said plurality of users that said items of evidence prove said conclusion.

27. The system of claim 26 further comprising:
means for determining a lower confidence limit for said calculated probabilities.

28. The system of claim 26 further comprising:
means for determining an upper confidence limit for said calculated probabilities.

29. The system of claim 10 further comprising:
means for calculating a mean value said burden of persuasion as input by said plurality of users.

30. The system of claim 29 further comprising:
means for determining a lower confidence limit for said burden of persuasion input by said plurality of users.

31. The system of claim 29 further comprising:
means for determining an upper confidence limit for said burden of persuasion input by said plurality of users.

32. The system of claim 10 wherein said conclusion is a fundamental issue of a trial, said system further comprising:
means for predicting a verdict of said trial based upon said inputs of said plurality of users.

33. The system of claim 10 wherein said conclusion is a fundamental issue of a trial, said system further comprising:

means for selecting potential jurors based upon said input information of said plurality of users.

34. A method for determining whether items of evidence prove a conclusion from input by a user comprising the steps of:

storing a list of items of evidence;

displaying each said item of evidence from said list to said user;

receiving input from said user comprising a truth probability for each of said items of evidence wherein said truth probability that an item is proved to be true, and a proof probability for each of said items of evidence proves said conclusion;

calculating a calculated probability that said conclusion is proved from truth probabilities and proof probabilities of said items of evidence;

comparing said calculated probability to a burden of persuasion in terms of probability;

determining whether said conclusion is proved responsive to said comparison; and said means for displaying a result of a determination of whether said conclusion is proved to said user.

35. The method of claim 34 further comprising the steps of:

determining a conclusion probability for each of said items of evidence that said each said items of evidence individually proves said conclusion; and storing said conclusion probability for each of said items of evidence individually proves said fundamental issue.

36. The method of claim 35 further comprising the steps of:

generating an ordered list of items of evidence based upon said conclusion probability of each of said items of evidence; and storing said ordered list in said memory.

37. The method of claim 36 further comprising the step of:

displaying said ordered list of items to said user.

38. The method of claim 35 further comprising the steps of:

determining a subset of said items of evidence that minimally exceeds said burden of persuasion; and storing said subset.

39. The method of claim 34 wherein said conclusion is a fundamental issue of a trial.

40. The method of claim 39 further comprising the steps of:

determining whether said user would vote in favor of a defendant in said trial from said calculated probability that said fundamental issue is proved;

determining whether said user would vote in favor of said plaintiff in said trial from said calculated probability that said fundamental issue is proved; and storing said vote of said user.

41. The method of claim 39 further comprising the steps of:

calculating damages to be awarded to a plaintiff in said trial based upon said probability that said fundamental issue has been proved.

42. The method of claim 34 wherein said input by said user comprises said burden of persuasion in terms of probability.

43. The method of claim 34 wherein a plurality of users input data about said trial, said method further comprises the steps of:

displaying a request for characteristic information to said user;

receiving an input of said characteristic information by said user; and storing said characteristic information received from each of said plurality of users.

44. The method of claim 43 further comprising the step of:

determining whether a result from a plurality of users is acceptable.

45. The method of claim 43 further comprising the step of:

determining an amount of additional users needed to make a result acceptable.

46. The method of claim 43 further comprising the steps of:

generating a histogram of said probability that said conclusion has been proved from said probabilities determined for each of said pluralities of users.

47. The method of claim 43 further comprising the step of:

determining a mean for said plurality of users of said calculated probability.

48. The method of claim 43 further comprising the step of:

generating a histogram of said probability that said conclusion is proved from said calculated probabilities of said plurality of users.

49. The method of claim 43 further comprising the step of:

generating a histogram of said probability that said conclusion is disproved from said calculated probabilities for said plurality users.

50. The method of claim 43 further comprising the step of:

generating a histogram of a burden of persuasion in probability as received as input from said plurality of users.

51. The method of claim 43 further comprising the step of:

calculating a mean value for each of said items of evidence that the item of evidence is true from truth probabilities input by said plurality of users.

52. The method of claim 51 further comprising the step of:

determining a lower confidence limit for each of said items of evidence that the item of evidence is true from truth probabilities input by said plurality of users.

53. The method of claim 51 further comprising the step of:

determining an upper confidence limit for each of said items of evidence that an item of evidence is true from truth probabilities input by said plurality of users.

54. The method of claim 43 further comprising the step of:

calculating a mean value for each of said items of evidence that said item of evidence proves said conclusion from said proof probabilities input by said plurality of users.

55. The method of claim 54 further comprising the step of:

determining a lower confidence limit for each of said items of evidence that an item of evidence proves said conclusion from said proof probabilities input by said plurality of users.

56. The method of claim 54 further comprising the step of:

determining an upper confidence limit for each of said items of evidence that said item of evidence proves said conclusion from said proof probabilities input by said plurality of users.

57. The method of claim 43 further comprising the step of:

calculating a mean value for each of said items of evidence that an item of evidence disproves said conclusion from said proof probabilities input by said plurality of users.

58. The method of claim 57 further comprising the step of:
determining a lower confidence limit for each of said items of evidence that said item of evidence disproves said conclusion from said proof probabilities input by said plurality of users.

59. The method of claim 57 further comprising the step of:
determining an upper confidence limit for each of said items of evidence that an item of evidence disproves said conclusion from said proof probabilities input by said plurality of users.

60. The method of claim 43 further comprising the step of:
calculating a mean value for said calculated probabilities from said plurality of users that said items of evidence prove said conclusion.

61. The method of claim 60 further comprising the step of:
determining a lower confidence limit for said calculated probabilities.

62. The method of claim 60 further comprising the step of:
determining an upper confidence limit for said calculated probabilities.

63. The method of claim 43 further comprising the step of:
calculating a mean value said burden of persuasion as input by said plurality of users.

64. The method of claim 63 further comprising the step of:
determining a lower confidence limit for said burden of persuasion input by said plurality of users.

65. The method of claim 63 further comprising the step of:
determining an upper confidence limit for said burden of persuasion input by said plurality of users.

66. The method of claim 43 wherein said conclusion is a fundamental issue of a trial and said method further comprises the step of:
predicting a verdict of said trial based upon said inputs of said plurality of users.

67. The method of claim 43 further comprising the step of:
selecting potential jurors based upon said input information of said plurality of users.

* * * * *